United States Patent [19]

Ohkado

[11] Patent Number: 5,717,426

[45] Date of Patent: Feb. 10, 1998

[54] METHOD FOR FORMING A NUMERIC ENTRY FIELD AND A METHOD FOR POSITIONING A CURSOR IN THE NUMERIC ENTRY FIELD

[75] Inventor: Akira Ohkado, Yokohama, Japan

[73] Assignee: International Business Machines Corporation, Armonk, N.Y.

[21] Appl. No.: 627,857

[22] Filed: Apr. 3, 1996

[30] Foreign Application Priority Data

Apr. 25, 1995 [JP] Japan ................................ 7-100936

[51] Int. Cl.$^6$ ................................................ G09G 5/08
[52] U.S. Cl. ................................ 345/157; 345/145
[58] Field of Search ........................ 345/157, 145, 345/156, 163, 168, 333, 326; 395/792, 803; 364/709.01, 709.07, 709.08, 709.13

[56] References Cited

U.S. PATENT DOCUMENTS 3,639,734  2/1972  Kimura et al. ................ 345/815.53

*Primary Examiner*—Dennis-Doon Chow
*Attorney, Agent, or Firm*—Anthony N. Magistrale

[57] ABSTRACT

Disclosed is a method which includes displaying a cursor at a predetermined position in a numeric string and editing the numeric string by either one of; (1) inserting a numeral or a symbol at the cursor position, (2) replacing a numeral or symbol at the cursor position or (3) deleting a numeral at the cursor position or deleting a numeral preceding the cursor position. A digit separator is then inserted into the edited numeric string and the resultant numeric string is displayed on a display device. The cursor is then moved to a new position where another editing step is to be performed on a numeral or symbol that is one position to the right of the numeral or symbol that was inserted, replaced or deleted. Another method disclosed includes displaying a cursor for a numeric string alteration operation at a predetermined cursor position in a numeric string that consists of an optional prefix and a numeric portion wherein a digit separator is counted as one character. A cursor shift value is then defined and set according to the operation to be performed. After the operation, the cursor is displayed at a new cursor position which is equal to the predetermined cursor position plus the cursor shift value.

5 Claims, 2 Drawing Sheets

METHOD FOR FORMING A NUMERIC ENTRY FIELD AND A METHOD FOR POSITIONING A CURSOR IN THE NUMERIC ENTRY FIELD

BACKGROUND OF THE INVENTION

1. Field of the Invention

The present invention relates to a method for forming a numeric entry field wherein an editing operation is performed immediately before or at a cursor position, a digit separator is inserted into a numeric string, the resultant numeric string is displayed and the cursor is shifted to a new position that is one position to the right of the position where the editing operation was performed. The present invention also relates to a method for positioning a cursor in the numeric entry field wherein a cursor is displayed for a numeric string alteration operation at a predetermined cursor position in a numeric string, a cursor shift value is then defined and set according to the operation to be performed and after the operation, the cursor is displayed at a new cursor position which is equal to the predetermined cursor position plus the cursor shift value

2. Description of Related Art

For character input, major operating systems for personal computers, such as IBM Corp.'s OS/2 (an IBM trademark), and Microsoft Corp.'s Windows (a Microsoft trademark) have a general-purpose character entry field (hereafter referred to as a "character entry field").

A conventional method for inserting a character into the character entry field will be briefly explained. First, a cursor is moved to an arbitrary position in the character entry field by using an input device, such as a mouse. Then, when characters are input at a keyboard, the cursor in the character entry field is sequentially shifted by the number of characters that have been entered, and the cursor is always positioned for the input of the next character.

Conventional movement of the cursor will now be explained more specifically. For this explanation, assume that the character entry field is represented by [ ], and the shape of the cursor in the character entry field is defined as "|" with the right side of the displayed cursor | being designated as the character input position. When the cursor | is positioned at the top of the field, as in [| ], for example, and an "a" is entered from the keyboard, the "a" is displayed as in [a| ], with the cursor |having been shifted to the right by one character to indicate the input position for the next character.

The conventional method for handling the character input field when some characters have already been entered in the character entry field will now be described. For character insertion, suppose that the state of the character entry field is as represented by [abd ]. When a "c" is to be inserted between the "b" and the "d," the cursor is moved and positioned between the "b" and the "d" so that the appearance of the character entry field is as in [ab|d ]. Then, when a "c" is input at the keyboard, the "c" is inserted as in [abc|d ], and the cursor is shifted to the right by one character.

For character deletion, with the cursor having been moved by a mouse, or by a keyboard, so that it is between the "b" and the "c" as in the character entry field of [ab|cd ], when the deletion key on the keyboard is depressed, the "c" is deleted and the appearance of the resultant field is as in [ab|d ]. When the backspace key is depressed, the "b" is deleted, as is shown in [a|cd ].

The input of characters and the editing of the characters can be performed by using a mouse, etc., to move the cursor to an arbitrary position in the character entry field.

Let us consider a case where numerals, such as money values, are entered by using the above conventional character entry field. When, for example, a value of $1,234 is to be input, the characters and numerals "$", "1", ",", "2", "3", "4" are input in order to acquire [$1,234|]. In such a character entry field, when the character string [$1,234| ] in the field is to be changed to $12,345, after the "5" is inserted, the "," must be deleted either by moving the cursor to the left of the "," and depressing the deletion key, or by moving the cursor to the right of the "," and depressing the backspace key. In addition, the cursor must be moved and positioned between the "2" and the "3" and a "," must be inserted. Such an operation is very tedious, and contributes to an increase in the number of input errors.

As described above, to change the numerals in the character entry field, the position of the "," that divides the numerals into three digit sets must be adjusted. Further, a numeric entry field must be provided so that even when the position of the "," is shifted the cursor is automatically moved to the proper position to prevent an operator from entering the next digit in the wrong position.

Although the OS/2 and Windows operating systems previously mentioned have character entry fields, they do not have a special field for numeric string entries. Further, even in the spreadsheet applications run on the operating system, editing is performed when the user completes the one number entry and the value is reflected into the call and no edits are done during numeric entry operation.

In addition, development support software that is associated with a graphic user interface (GUI) does not include a special field for numeric string entries wherein editing is performed simultaneously with input. Even in the Windows environment, for example, for which many kinds of GUI development support software are available, a masked editing field for Visual Basic 3.0 (English version) (a Microsoft trademark) has an input field such as $_{13}$ _,_____ that corresponds to a mask and into which numerals are filled in. For example, when a "1" is inserted into $___,____, the resultant field shows simply $1_,____.

As an addition to the Visual Basic 2.0 Japanese version, a money value input field is provided by Bunka Orient Co., Ltd. In this field, integer values can only be inserted and deleted at the last (lowest) digit position, and numerals at digit positions other than that can not be corrected.

SUMMARY OF THE INVENTION

One embodiment of the present invention is directed to a method for forming a numeric entry field which includes the step of displaying a cursor at a predetermined position in a numeric string that is displayed on a display device. Next, an editing or alteration operation is performed immediately before or at a position specified by the cursor. A digit separator is inserted into a numeric string and the resultant numeric string is displayed on the display device. The method includes a step of shifting the cursor to a new position where a succeeding editing operation is to be performed on a numeral or symbol that is one position to the right of the position where the editing operation was performed.

The editing operation can be any one of the following: (1) inserting a numeral or a symbol that is entered by input means into a position specified by the cursor, (2) replacing a value that is positioned at the cursor with a numeral or a symbol that is entered by input means or (3) deleting a numeral located either immediately before or at the position of said cursor when deletion is requested from input means.

Another embodiment of the present invention is directed to a method for positioning a cursor in a numeric entry field which includes the step of displaying a cursor for numeric string alteration at a predetermined cursor position in a numeric string that consists of an optional prefix and a numeric portion wherein a separator for numerals is counted as one character. The predetermined cursor position is a numbered position that is counted from the head of the numeric string. The method includes defining a cursor shift value Diff=NewPrefLen+NewDigitsLen−OldPrefLen− OldDigitsLen, where OldPrefLen denotes a length of the optional prefix before numeral alteration is performed, OldDigitsLen denotes a length of the numeric portion, NewPrefLen denotes a length of a prefix of a numeric string that is obtained by editing after the numeral alteration and NewDigitsLen denotes a length of a numeric portion of the numeric string after the numeral alteration. After the numeral alteration or editing operation is performed a new cursor position is determined and is equal to the predetermined cursor position plus the cursor shift value. Lastly, the cursor is displayed at the new position.

A further embodiment of the present invention is directed to a method for positioning a cursor in a numeric entry field which includes the step of displaying a cursor for numeric string replacement at a predetermined cursor position in a numeric string that consists of an optional prefix and a numeric portion wherein a separator for numerals is counted as one character. The predetermined cursor position is a numbered position that is counted from the head of the numeric string. A cursor shift value is defined as (Diff+1)= (NewPrefLen+NewDigitsLen−OldPrefLen−OldDigitsLen) +1, where OldPrefLen denotes a length of the optional prefix before numeral replacement is performed, OldDigitsLen denotes a length of the numeric portion, NewPrefLen denotes a length of a prefix of a numeric string that is obtained by editing after the numeral replacement and NewDigitsLen denotes a length of a numeric portion of the resultant numeric string with the exception that the cursor shift value=(Diff+1)+1 when a digit separator of an edited numeric string is located at a position that is the original cursor position+1. After the numeral replacement, a new cursor position is determined and is equal to the predetermined cursor position plus the cursor shift value. The cursor is then displayed at the new position.

DETAILED DESCRIPTION OF THE INVENTION

Figure 1:
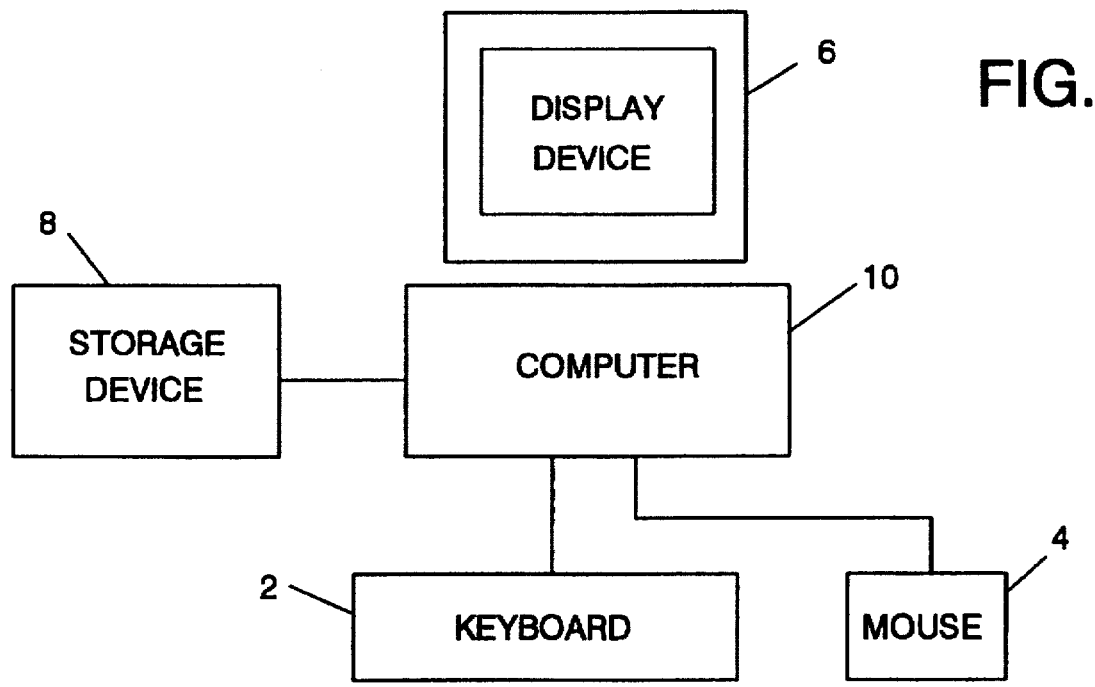
FIG. 1 is a block diagram of a computer system in accordance with the present invention.

A method for forming a numeric entry field according to one embodiment of the present invention will now be described while referring to FIGS. 1 through 3. FIG. 1 is a diagram illustrating an example of a computer system that is employed in accordance with the present invention. As shown in FIG. 1, the computer system includes a keyboard 2 which serves as an input device for designation of an input position and the input of a numeral; a mouse 4 which serves as a pointing device with which to point at an input position; a display device 6 which displays an input numeric string; a storage device 8 which stores a numeric string that is to be displayed and its input position; and a computer 10 which controls the display device and the input/output devices and executes the processing.

The processing of the computer system will be generally explained. In an initial state, a numeric string that is stored in the storage device 8 is displayed on the display device 6. For example, if [124] is supposed to be displayed, the input position is pointed at by the mouse 4, a numeral is input at the keyboard 2 and the stored numeral is updated. Then, the editing that follows an editing option is performed on the numeric string and the edited numeric string is stored in the storage device 8 while the contents of a predetermined display area are erased enabling a new numeric string to be displayed.

When a position between the "2" and the "4" is pointed at by the mouse 4, the cursor is moved to that position and a "3" is entered from the keyboard 2. At this time, although the contents of the storage device 8 are "1234" momentarily, editing is performed on that numeric string and the resultant string "1,234" is stored while the contents of a predetermined display area are erased and the new numeric string "1,234" is displayed. The cursor is positioned between the "3" and the "4" as the next input position. When the input position lies within the predetermined display area, it is also possible to alter the input position (cursor position) by using the arrow keys on the keyboard 2.

Figure 2:
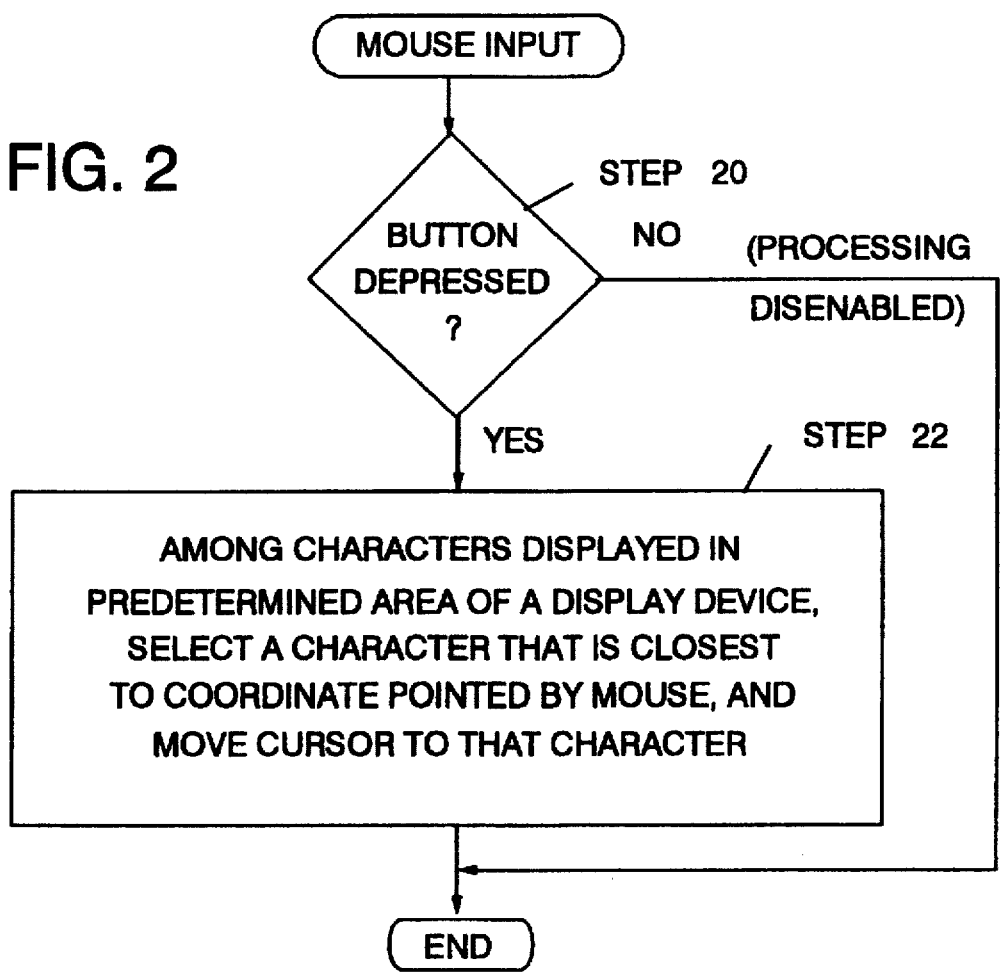
FIG. 2 is a flow chart for explaining the movement of a cursor by using a mouse in accordance with the present invention.

FIG. 2 is a flow chart showing the processing for moving the cursor by using the mouse 4. When a button of the mouse 4 is pressed (step 20), a character (numeral) is selected which is the closest to the coordinate of the pointer of the mouse 4 among characters (numerals) that are displayed in a predetermined area in the display device 6, and the cursor is moved to that character (step 22).

Figure 3:
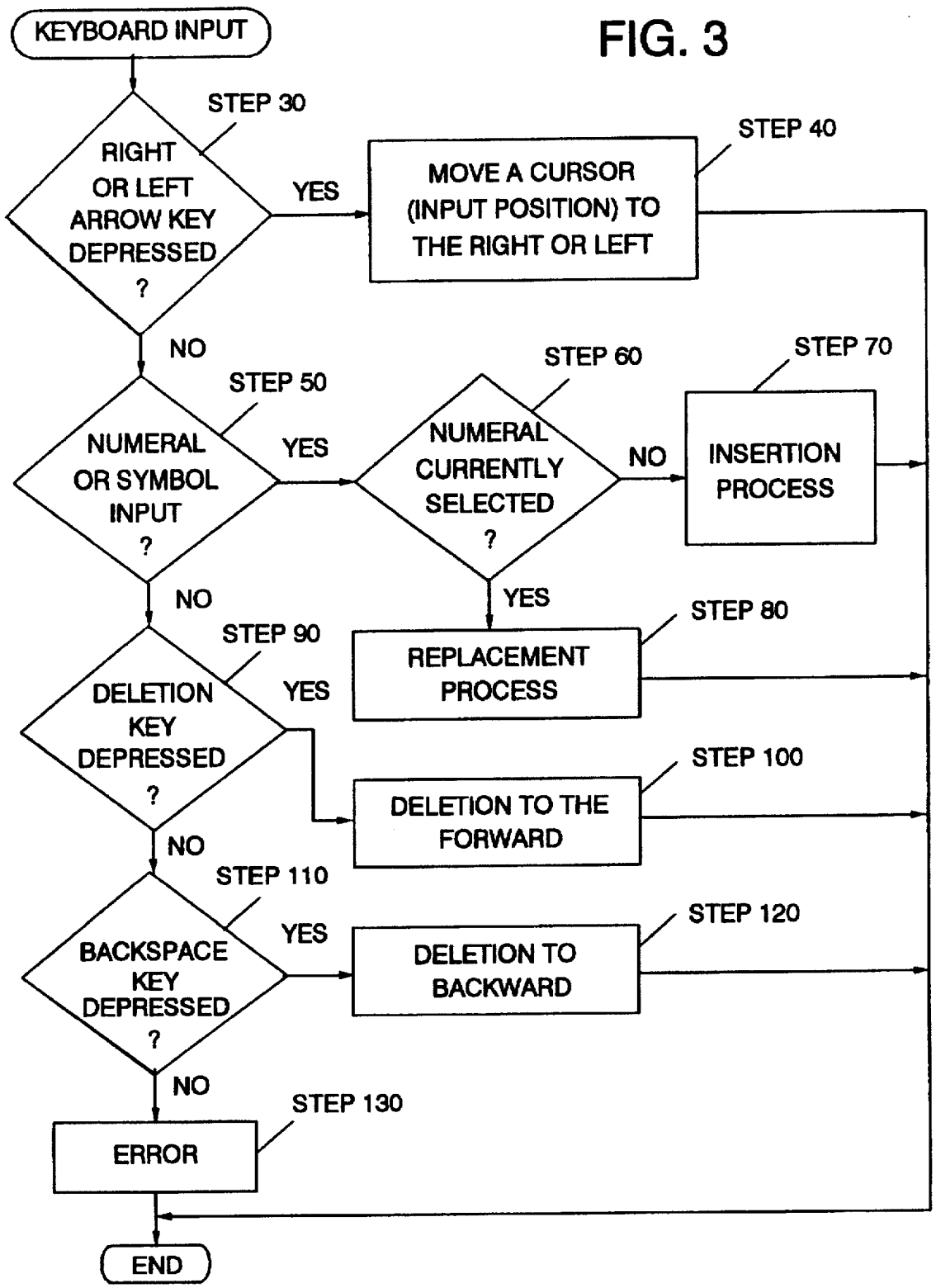
FIG. 3 is a flow chart showing the processing performed in a numeric entry field in accordance with the present invention.

FIG. 3 is a flow chart showing the processing for a numeric entry field when the input is made at the keyboard 2. Assuming that the cursor has been moved by the mouse 4 as shown in FIG. 2, a check is performed to determine whether or not a right or left arrow key on the keyboard 2 has been depressed (step 30). When the arrow key has been depressed, the cursor is moved to the right or to the left a specific distance (step 40).

When the depressed key is not an arrow key, a check is performed to determine whether or not a numeral or a symbol has been entered (step 50). When a numeral or a symbol has been entered, a check is performed to determine whether the input mode is an insertion mode where a numeral is not selected or a replacement mode where a numeral to be replaced is selected (step 60). When the input mode is the insertion mode, the insertion process is performed (step 70). When the input mode is the replacement mode, the replacement process is performed (step 80).

The insertion process at step 70 will now be explained in detail. When a numeral is not selected in the insertion mode, upon the depression of a numeral key (including a symbol key when an edition parameter permits it), a numeral that is input is inserted into a cursor position and a numeric string editing function is called to prepare an edited numeric string. The numeric string editing function takes the numeric string immediately after the insertion/replacement/deletion ("\123, 4567" for example) and performs the arrangement of a symbol and the insertion or the deletion of a comma as needed, and a correct numeric string that is separated by commas every three digits is returned ("\1,234,567" for the above example).

Then, the coordinate position of each numeral (character) is calculated and a new position for the cursor is calculated. After that, a numeric string (including an optional prefix, such as a symbol or a currency identifier) that is displayed in the display device 6 is erased and an edited numeric string is displayed. The cursor is positioned at a new cursor position.

The replacement process at step 80 will now be described in more detail. When a specific numeral is selected in the replacement mode and a numeric key is depressed, the currently selected numeral is replaced by the input numeral, and the numeric string editing function is called to produce the edited numeric string. Then, the coordinate position for each numeral (character) is calculated and a new position for the cursor is also calculated. Sequentially, the numeric string that is displayed in the display device 6 is erased, the edited numeric string is displayed, and finally, the cursor is moved to the new cursor position.

When the input at step 50 in the flow chart in FIG. 3 is found to be neither a numeral nor a symbol, at step 90, a check is performed to determine whether or not the deletion key has been depressed. When the deletion key has been depressed, forward deletion is performed (step 100).

In the forward deletion at step 100, when the input is made via the deletion key, a numeral positioned at the cursor (to the right of the cursor) is deleted (when a character to be deleted is a comma, the comma and the succeeding numeral are deleted). The numeric string editing function is then called to prepare the edited numeric string, and the coordinate position for each numeral is calculated and also a new cursor position is also acquired. Sequentially, the numeric string that is displayed in the display device 6 is erased and the edited numeric string is displayed, and finally the cursor is shifted to the new cursor position.

If, at step 90, the input is not made through the deletion key, at step 110, a check is performed to determine whether or not a backspace key has been depressed. When the backspace key has been depressed, the backward deletion is performed (step 120). When the backspace key is not depressed, it is assumed that an error has occurred, and an error process is performed (step 130).

In the backspace deletion at step 130, when the input is made through the backspace key, a numeral positioned at the cursor (to the left of the cursor) is deleted (when the character to be deleted is a comma, the comma and the preceding numeral are deleted). The numeric string editing function is then called to prepare the edited numeric string, and the coordinate position for each numeral is calculated and a new cursor position is also acquired. Sequentially, the numeric string that is displayed in the display device 6 is erased and the edited numeric string is displayed, and finally the cursor is moved to the new cursor position.

Through the above described process, it is possible to realize a numeric entry field that can be used in the same fashion as is the general-purpose character entry field. A method for positioning a cursor in a numeric entry field for the above described insertion/replacement/forward and backward deletion will now be described.

A numeric string includes an optional prefix, such as a symbol or a currency identifier, and a numeric portion. The length of the prefix before processing, such as insertion/deletion, is performed is defined as OldPrefLen, and the length of the numeric portion is defined as OldDigitsLen. The length of the prefix of a numeric string, for which the above processing and the editing have been performed, is defined as NewPrefLen, and the length of the numeric portion of the new numeric string is defined as NewDigitsLen. The value Diff is defined as: Diff=NewPrefLen+NewDigitsLen−OldPrefLen−OldDigitsLen.

It should be noted that the length of the numeric portion includes a comma, which is a separator for numerals (digit separator), as one character. In the case of ¥1,234, for example, the length of the prefix (PrefLen)=1 and the length of the numeric portion (DigitsLen)=5.

Further, the cursor is represented as "|" and the cursor position is represented as a numbered position that is counted from the top of the numeric string. With ¥1,2|34, the cursor position=4.

(1) Method for positioning a cursor in a numeral insertion process

The cursor shift value is defined as Diff. By using the numeric string of ¥134 as an example, when the cursor | is positioned as in ¥1|34, i.e., the cursor position=2 (original cursor position) and when a "2" is to be inserted before the "3" OldPrefLen=1 and OldDigitsLen=3 before the performance of the insertion process; and following the performance of the insertion/editing process, the obtained numeric string is ¥1,234 and NewPrefLen=1 and NewDigitsLen=5. Thus, the cursor shift value=Diff=NewPrefLen+NewDigitsLen−OldPrefLen−OldDigitsLen=1+5−1−3=2, and the new cursor position=the original cursor position+the cursor shift value=2+2=4. The cursor | following the performance of the insertion process, is therefore positioned as in ¥1,2|34.

Since in this manner the cursor is newly located at the position that follows the numeral "2" which was inserted, the insertion process can be repeated, and the possibilities for erroneous presumptions regarding the input positions for the insertion of numerals and input errors due to tedious input operations can be considerably reduced.

(2) Method for positioning a cursor in a numeral replacement process

The cursor shift value is defined as Diff+1. It should be noted that when the character at the cursor position+1 in the edited numeric string is a comma, the cursor shift value= cursor shift value+1=(Diff+1)+1.

Again by using the numeric string of ¥1,234 as an example, when the cursor | is positioned as in ¥|1,234, i.e., the cursor position=1 (original cursor position) and when the "1" is to be replaced by a "9" OldPrefLen=1 and OldDigitsLen=5 before the performance of the replacement process; and following the performance of the replacement/editing process, the obtained numeric string is ¥9,234 and NewPrefLen=1 and NewDigitsLen=5. Since the character at the cursor position+1 in the edited numeric string is a comma, according to the above condition, the cursor shift value=(Diff+1)+1=(NewPrefLen+NewDigitsLen−OldPrefLen−OldDigitsLen+1)+1=(1+5−1−5+1)+1=2, and the new cursor position=the original cursor position+the cursor shift value=1+2=3. The cursor |, following the performance of the replacement process, is therefore positioned as in ¥9,|234.

Since in this manner the cursor is newly located at the position that follows the numeral "9" which was inserted as a replacement, and the comma, the sequential replacement process and another following process, such as the insertion, can be easily performed. This considerably reduces the possibility of erroneous presumptions regarding the input positions for the insertion of numerals and input errors due to tedious input operations.

As another example using the numeric string of ¥1,234, when the cursor | is positioned as in ¥1|234 i.e., the cursor position=3 (original cursor position) and when the "2" is to be replaced by an "8" OldPrefLen=1 and OldDigitsLen=5 before the performance of the replacement process; and following the performance of the replacement/editing process, the obtained numeric string is ¥1,834 and NewPrefLen=1 and NewDigitsLen=5. Since the character at the cursor position+1 in the edited numeric string is not a comma, the above condition does not apply for this case. Thus, the cursor shift value=Diff+1=NewPrefLen+ NewDigitsLen−OldPrefLen−OldDigitsLen+1=1+5−1−5+ 1=1, and the new cursor position=the original cursor position+the cursor shift value=3+1=4. The cursor | following the performance of the replacement process, is therefore positioned as in ¥1,8|34.

In this case also, since in this manner the cursor is newly located at the position that follows the numeral "8," which was inserted as a replacement, the sequential replacement process and another following process, such as the insertion, can be easily performed. Again, this considerably reduces the possibility for erroneous presumptions regarding the input positions for the insertion of numerals and input errors due to tedious input operations.

(3) Method for positioning a cursor in a numeral deletion process while using a deletion key (a numeral at a cursor is deleted)

When a target to be deleted is a comma, the comma and a succeeding numeral are deleted. The processing method will be briefly described by using the forms of IF, (THEN), ELSE, which are normally used in programming languages.
IF (−Diff>1 and the original cursor position not= OldPrefLen)
  IF (a comma and its succeeding numeral are to be deleted)
    cursor shift value=0
  ELSE
    cursor shift value=−1
ELSE IF (original cursor position<OldPrefLen and OldPrefLen=NewPrefLen)
  cursor shift value=1
ELSE
  IF (a comma and the succeeding numeral are to be deleted)
    cursor shift value=1
  ELSE
    cursor shift value=0

This method will now be specifically described by employing several examples. By using the numeric string of ¥1,234 as an example, when the cursor | is positioned as in ¥|1,234 i.e., the cursor position=1 (original cursor position) and when the "1" is to be deleted, OldPrefLen=1 and OldDigitsLen=5 before the performance of the deletion process; and following the performance of the deletion/editing process, the obtained numeric string is ¥234, and NewPrefLen=1 and NewDigitsLen=3.

Although −Diff=2>1, the original cursor position= OldPrefLen, and this is not a case that a comma and its succeeding numeral are to be deleted. Therefore, according to the above conditions, the cursor shift value=0 and the new cursor position=the original cursor position+the cursor shift value=1+0=1. The cursor | following the performance of the deletion process, is therefore positioned as in ¥|234.

In this case also, since the cursor is newly located at the position that follows the deleted numeral and the comma, the sequential deletion process and another following process, such as an insertion, can be easily performed, and the possibilities for erroneous presumptions regarding the input positions for the insertion of numerals and input errors due to tedious input operations can be considerably reduced.

Again by using the numeric string of ¥1,234 as an example, when the cursor | is positioned as in ¥1,|234 i.e., the cursor position=3 (original cursor position) and when the "2" is to be deleted, OldPrefLen=1 and OldDigitsLen=5 before the performance of a deletion process; and following the performance of the deletion/editing process, the obtained numeric string is ¥134, and NewPrefLen=1 and NewDigitsLen=3. −Diff=2>1 and the original cursor position not=OldPrefLen, and this is not the case to delete a comma and its succeeding numeral, nor a numeral and its succeeding comma. Therefore, according to the above conditions, the cursor shift value=−1 and the new cursor position=the original cursor position+the cursor shift value= 3−1=2. The cursor | following the performance of the deletion process, is therefore positioned as in ¥1|34.

In this case also, since the cursor is newly located at the position where the alternation process can be performed on the numeral "3" which succeeds the numeral "2" that has been deleted, the sequential deletion process and another following process, such as an insertion, can be easily performed. The possibility for erroneous presumptions regarding the input positions for the insertion of numerals and input errors due to tedious input operations are considerably reduced. It should be noted that in these examples, following the performance of the editing process a comma disappears not because it is deleted based on information that concerns the cursor position, but because the repositioning of the comma is performed by editing a numeric string at the editing step.

By using the numeric string of ¥12,345 as an example, when the cursor | is positioned as in ¥12|,345 i.e., the cursor position=3 (original cursor position) and when the "," and the "3" are to be deleted, OldPrefLen=1 and OldDigitsLen=6 before the performance of the deletion process; and following the performance of the deletion/ editing process, the obtained numeric string is ¥1,245 and NewPrefLen=1 and NewDigitsLen=5. Since −Diff=1 and in this case, both a comma and its succeeding numeral are to be deleted, according to the above conditions, the cursor shift value=1 and the new cursor position=the original cursor position+the cursor shift value=3+1=4. The cursor | following the performance of the deletion process, is therefore positioned as in ¥1,2|45.

In this case also, the cursor is newly located at a position where the alternation process can be performed on the numeral "4" which succeeds the numeral "3" that was deleted.

Again by using the numeric string of ¥1,234 as an example, when the cursor | is positioned as in ¥1|,234, i.e., the cursor position=2 (original cursor position), and when the "," and the "2" are to be deleted, OldPrefLen=1 and OldDigitsLen=5 before the performance of the deletion process; and following the performance of the deletion/ editing process, the obtained numeric string is ¥134, and NewPrefLen=1 and NewDigitsLen=3. Although −Diff=2, the original cursor position not=OldPrefLen, and in this case a comma and its succeeding numeral are to be deleted. Therefore, according to the above conditions, the cursor shift value=0 and the new cursor position=the original cursor position+the cursor shift value=2+0=2. The cursor | following the performance of the deletion process, is therefore positioned as in ¥1|34.

Since in this manner the cursor is newly located at a position that was occupied by either a deleted numeral or a deleted comma, the subsequent deletion process and another following process, such as an insertion, can be easily performed, and the possibilities for erroneous presumptions regarding input positions to enter numerals and input errors due to tedious input operations can be considerably reduced.

(4) Method for positioning a cursor in a numeral deletion process using a backspace key The processing method will be briefly explained by using the forms of IF, (THEN), and ELSE, as in the above case.

IF (the original cursor position>OldPrefLen and (the original cursor position+Diff)<NewPrefLen)

the cursor shift value=the original cursor position −NewPrefLen

ELSE the cursor shift value=Diff.

By using the numeric string of ¥1,234,567 as an example, when the cursor I is positioned as in ¥1,234.5|67 i.e., the cursor position=8 (original cursor position), and when the "5" is to be deleted, OldPrefLen=1 and OldDigitsLen=9 before the performance of the deletion process; and following the performance of the deletion/editing process, the obtained numeric string is ¥123,467 and NewPrefLen=1 and NewDigitsLen=7. Since the original cursor position= 8>OldPrefLen=1, and the original cursor position+Diff=8+ (−2)=6>NewPrefLen=1, according to the above conditions, the cursor shift value=Diff=−2 and the new cursor position= the original cursor position+the cursor shift value=8−2=6. The cursor I, following the performance of the deletion process, is therefore positioned as in ¥123,4|67. In this case also, the cursor is newly located at a position that was occupied by a numeral that was deleted.

According to the method for positioning a cursor for the insertion/replacement/forward and backward deletion in the numeric entry field in this embodiment, the insertion/ replacement/forward and backward deletion can be easily repeated, and the possibilities for erroneous presumptions regarding input positions for the insertion of numerals and input errors due to tedious input operations can be extremely reduced.

As is described above, using this invention, a numeric entry field, where an input position can be selected by using a mouse, a numeral can be inserted, replaced, or deleted, at an arbitrary position, it makes possible to implement and compatible with a conventional character input field.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A method for positioning a cursor in a numeric entry field comprising the steps of:

displaying a cursor for numeric string alteration at a predetermined cursor position in a numeric string that consists of an optional prefix and a numeric portion wherein a separator for numerals is counted as one character, said predetermined cursor position is a numbered position that is counted from the head of said numeric string;

defining a cursor shift value Diff=NewPrefLen+ NewDigitsLen−OldPrefLen−OldDigitsLen, where OldPrefLen denotes a length of said optional prefix before numeral alteration is performed, OldDigitsLen denotes a length of said numeric portion, NewPrefLen denotes a length of a prefix of a numeric string that is obtained by editing after said numeral alteration and NewDigitsLen denotes a length of a numeric portion of said numeric string after said numeral alteration;

determining a new position of said cursor after said numeral alteration to be said new cursor position= predetermined cursor position+said cursor shift value; and displaying said cursor at said new position.

2. The method of claim 1, wherein said numeral alteration is a numeral insertion operation at said predetermined cursor position.

3. The method of claim 1, wherein said numeral alteration is a numeral deletion operation at said predetermined cursor position and said cursor shift value is defined upon depression of a deletion key by input means, said determining step including:

computing a cursor shift value as follows: (1) if −Diff>1, said predetermined cursor position (not=) OldPrefLen and said digit separator and a numeral are to be deleted, said cursor shift value is set to 0, (2) if −Diff>1, said predetermined cursor position (not=) OldPrefLen and not both of said digit separator and a numeral are to be deleted, said cursor shift value is set to −1, (3) if one of −Diff>1 or said predetermined cursor position (not=) OldPrefLen does not hold, and said predetermined cursor position<OldPrefLen and OldPrefLen= NewPrefLen, said cursor shift value is set to 1, (4) if none of said (1)-(3) are true, and said digit separator and a numeral are to be deleted, said cursor shift value is set to 1; otherwise said cursor shift value is set to 0.

4. The method of claim 1, wherein said numeral alteration is a numeral deletion operation at said predetermined cursor position and said cursor shift value is defined upon depression of a backspace key by input means, said determining step including:

computing a cursor shift value as follows: (1) if said predetermined cursor>OldPrefLen and (said predetermined cursor position+Diff)<NewPrefLen, said cursor shift value is set to said predetermined cursor position− NewPrefLen, (2) if (1) is not true said cursor shift value=Diff.

5. A method for positioning a cursor in a numeric entry field comprising the steps of:

displaying a cursor for numeric string replacement at a predetermined cursor position in a numeric string that consists of an optional prefix and a numeric portion wherein a separator for numerals is counted as one character, said predetermined cursor position is a numbered position that is counted from the head of said numeric string;

defining a cursor shift value=Diff+1=(NewPrefLen+ NewDigitsLen−OldPrefLen−OldDigitsLen)+1, where OldPrefLen denotes a length of said optional prefix before numeral replacement is performed, OldDigitsLen denotes a length of said numeric portion, NewPrefLen denotes a length of a prefix of a numeric string that is obtained by editing after said numeral replacement and NewDigitsLen denotes a length of a numeric portion of said resultant numeric string, with the exception that said cursor shift value=(Diff+1)+1 when a digit separator of an edited numeric string is located at a position that is said original cursor position+1;

determining a new position of said cursor following said numeral replacement to be said new cursor position= predetermined cursor position+said cursor shift value; displaying said cursor at said new position.

* * * * *